June 19, 1923.
H. WENNEBORG
TRAILER
Filed Nov. 30, 1921
1,459,521
3 Sheets-Sheet 1
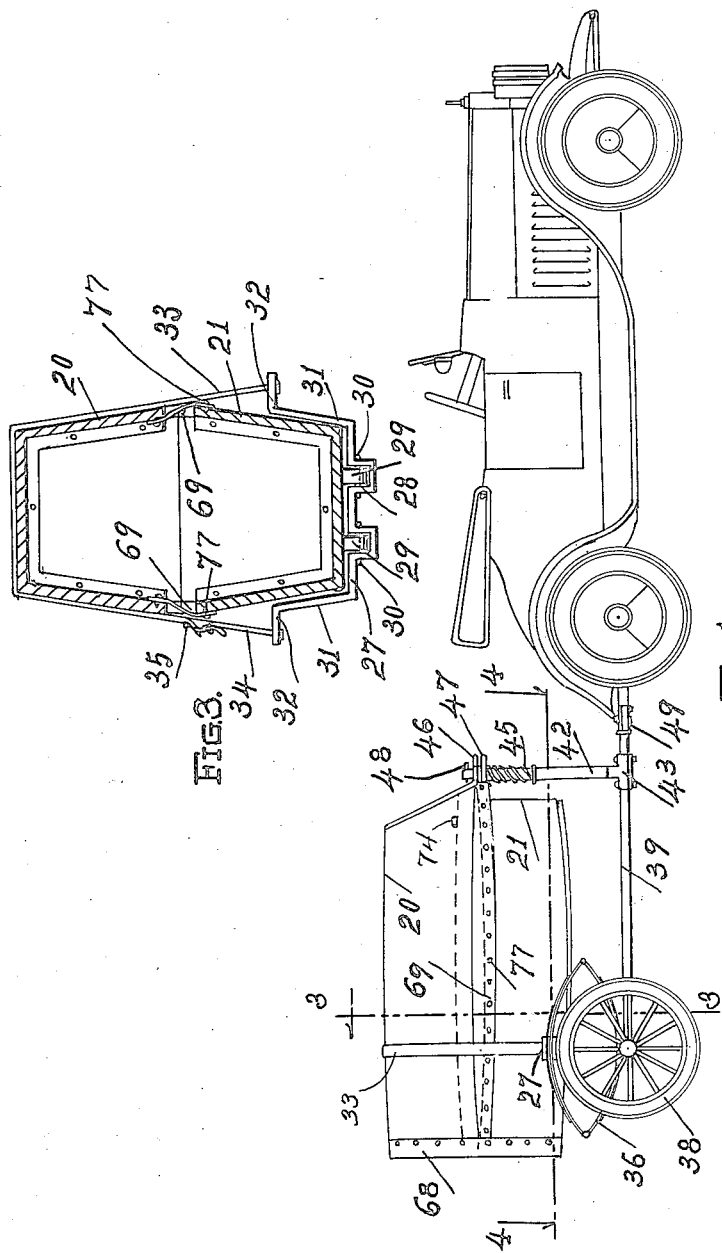
Witnesses.
Wayne Hudson.
Charlotte A. DuBois.
Inventor
HENRY WENNEBORG.
by Atty. N. DuBois.

June 19, 1923.
H. WENNEBORG
TRAILER
Filed Nov. 30, 1921
1,459,521
3 Sheets-Sheet 2
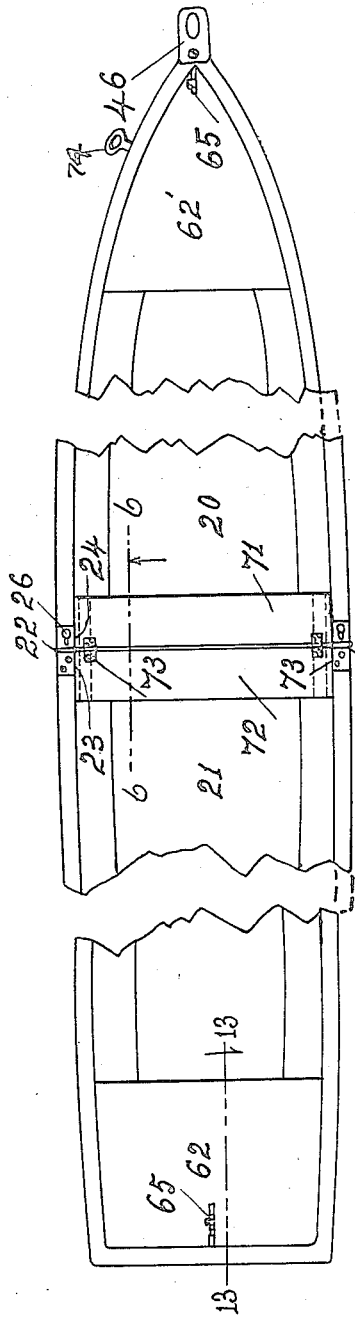
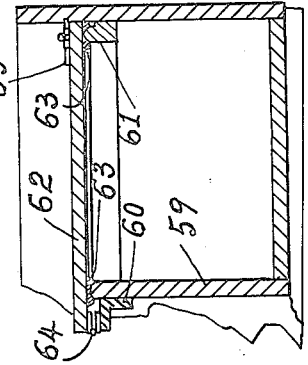
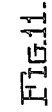
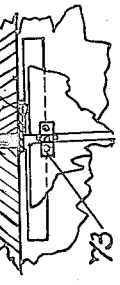
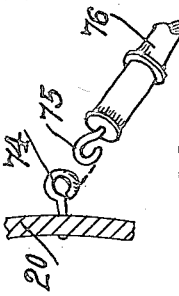
Witnesses.
Wayne Hudson.
Charlotte A. DuBois.
Inventor:
HENRY WENNEBORG.
by Hetty N. DuBois June 19, 1923.
H. WENNEBORG
TRAILER
Filed Nov. 30, 1921
1,459,521
3 Sheets-Sheet 3
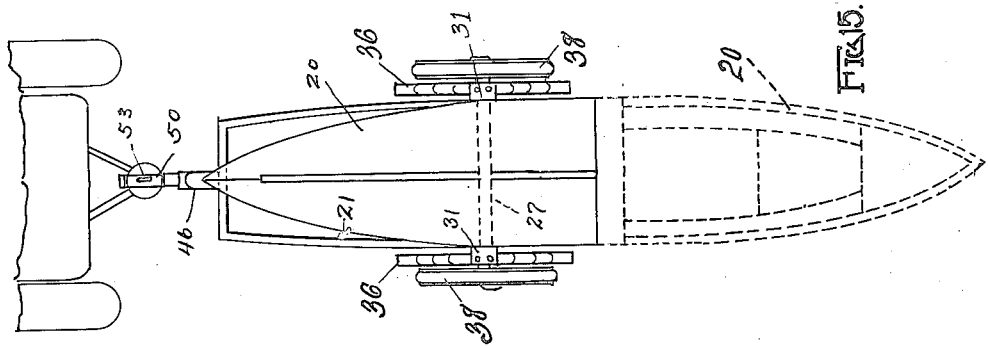
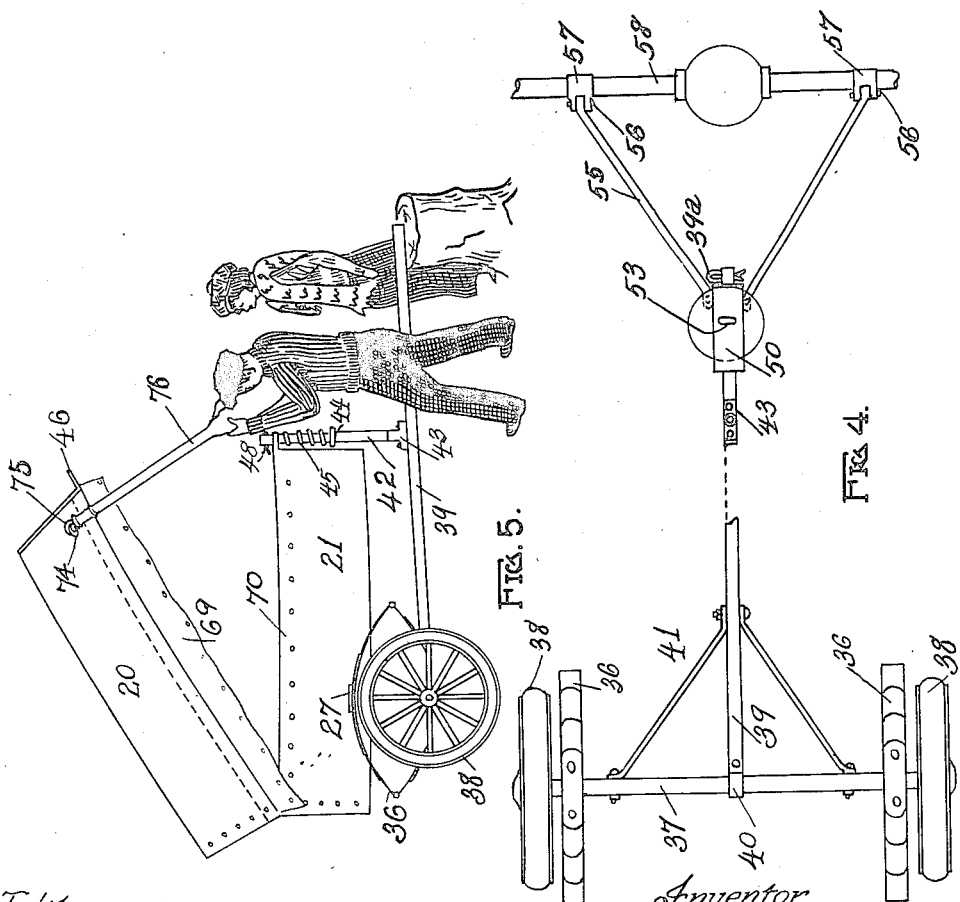
Witnesses
Wayne Hudson
Charlotte A. DuBois
Inventor
HENRY WENNEBORG.
by Att'y N. DuBois Patented June 19, 1923.

1,459,521

UNITED STATES PATENT OFFICE.

HENRY WENNEBORG, OF SPRINGFIELD, ILLINOIS, ASSIGNOR OF ONE-HALF TO ENOS S. SPINDEL, OF SPRINGFIELD, ILLINOIS.

TRAILER.

Application filed November 30, 1921. Serial No. 518,936.

*To all whom it may concern:*

Be it known that I, HENRY WENNEBORG, a citizen of the United States, residing at Springfield, in the county of Sangamon and State of Illinois, have invented a new and useful Trailer, of which the following is a specification.

The invention relates to trailers used by tourists in conjunction with automobiles, to carry equipment, supplies and baggage which cannot be carried conveniently in the vehicle.

The purposes of the invention are to provide a trailer having a body in the form of a boat comprising two sections hinged together so that when extended the boat may be used to navigate on water; to provide means for water-tight connection of the extended boat sections; to provide means for covering the openings at the hinged ends of the boat sections and the openings between the longitudinal edges of the folded boat sections, to exclude rain and dust; to provide supporting springs and securing devices adjacent to each end of the lower-section to absorb shock and prevent rattling of the trailer while traveling on the road; to provide in each boat-section, a stowage compartment and a water-tight closure for each compartment; to provide a truck having a swivel connection with the towing vehicle; to provide means for easily and quickly attaching the truck to the vehicle; to provide means for raising and extending the upper boat-section; to provide means for facilitating the detaching the boat from the truck; and to provide other new and useful structural features.

The invention is illustrated in the annexed drawings to which reference is hereby made.

Figure 1 is a side elevation of a trailer embodying my invention, shown in connection with an automobile;

Fig. 2 is an enlarged top plan of the extended trailer-body, the supporting wheels and the draft-gear being omitted;

Fig. 3 is an enlarged vertical section through the trailer-body on the line 3—3 of Fig. 1;
Fig. 4 is a horizontal section on the line 4—4 of Fig. 1, showing the draft-gear and part of the yoke, the trailer-body being omitted;

Fig. 5 is a side elevation of the detached trailer and shows means for raising the upper section of the trailer-body while it is being extended;

Fig. 6 is an enlarged fragmental vertical section on the line 6—6 of Fig. 2, showing details of the means for water-tight connection of the united sections of the trailer-body;

Fig. 7 is a horizontal section on the line 7—7 of Fig. 6;

Fig. 8 is an enlarged side elevation of the fifth-wheel and swivel sleeve;

Fig. 9 is a vertical section through the fifth-wheel and swivel sleeve, taken on the line 9—9 of Fig. 8;

Fig. 10 is a perspective view of one axle clip used to connect the draft-gear of the trailer with the axle of the towing vehicle;

Fig. 11 is an enlarged side elevation of the standard which supports the forward end of the trailer-body;

Fig. 12 is an enlarged top view of one of the adjustable hinges used to connect the sections of the trailer-body;

Fig. 13 is an enlarged vertical section through one water-tight compartment of the trailer-body, taken on the line 13—13 of Fig. 2;

Fig. 14 is an enlarged detail of a hook-and-eye device for connecting an oar with the upper section of the trailer-body for use in extending the trailer-body; and Fig. 15 is a top plan showing the trailer connected with the towing vehicle and showing in dotted lines the extended position of the upper section of the trailer-body.

The same reference numerals designate the same parts in all the views.

Briefly stated, the trailer comprises running gear connected with the towing vehicle, a yoke carried by the running gear, a body supported on the yoke and consisting of two boat sections having hinge connection with each other, springs fore and aft, yieldingly supporting the body and other minor details of construction as will hereinafter more fully appear.

The body comprises an upper section 20 and a lower section 21 connected by hinges 22. The body when extended is preferably, but not necessarily, in the form of a boat as shown in Fig. 2.

Each of the hinges 22 comprises a member 23 secured on one body-section, and a member 24 having a longitudinal slot 25 to accommodate a bolt 26 connecting the member 24 with the other section so that the hinge member 24 will be capable of longitudinal adjustment on the section to which it is attached, to admit of clamping the ends of the sections together to make a water-tight joint, by means to be described later.

The yoke, on which the section 21 is mounted, consists of a metal bar of rectangular cross-section (Figs. 1 and 3) bent to form a member 27 having ways 28 accommodating rollers 29 rotative on spindles 30; upwardly-extended members 31 parallel to the sides of the section; and lateral extensions 32, to which straps 33 and 34 are attached. The strap 33 extends upwardly around the section 20 and is connected with the strap 34 by a buckle 35.

The trailer-body 20—21 is mounted on leaf-springs 36 which are permanently attached to an axle 37 which is supported by suitable wheels 38. A draw bar 39 is connected with the axle by a strap 40. Braces 41 connect the draw bar with the axle. A standard 42 is fixed in a block 43 which is secured on the draw bar 39. A collar 44 fixed on the standard 42 supports a spring 45 coiled around the standard. Perforated plates 46 and 47 fixed on the respective body sections 20 and 21 are supported on the spring 45 and have free vertical movement on the standard 42 so that the spring makes a yielding support for the forward ends of the body section. The standard 42 and the spring 45 are of such length that the united body sections supported by the spring will normally occupy an approximately horizontal position in order that the trailer-body may, if desired, be used as a comfortable sleeping apartment. A cotter pin 48 extends through the standard 42 and prevents accidental upward movement of the plates 46 and 47. The draft-gear includes a fifth-wheel comprising a circular base 49 and a sleeve 50 rotative on the base and connected therewith by a stud 51 integral with the sleeve 50, so that the sleeve will swivel on the plate 49. The longitudinal bore 52 of the sleeve is adapted to receive the draft-bar 39. The sleeve 50 has also an eye 53 receiving a cord 54 used to connect the fifth-wheel with the towing vehicle so that it will not drag on the ground when the draft-gear is disconnected from the vehicle. The draft-bar 39 swivels in the bore 52 so that the wheels 38 may readily adapt themselves to different inclinations of the road on which the trailer is traveling. Braces 55 are permanently attached to the plate 49 and have at their free ends eyes to receive bolts 56 flexibly connecting the braces with axle clips 57 detachably connected with the axle 58 of the towing vehicle.

At the free end of each of the body sections 20 and 21 is a water-tight compartment for stowage of provisions, ice, etc. which it is desired to protect from heat and dirt. Except as to shape, the compartments are exactly alike; so a description of one will suffice for both. The side walls of the body section constitute the side walls of the compartment and the bottom of the boat section constitutes the bottom of the compartment.

A vertical wall 59 transverse to the body section is permanently attached to the sides and bottom of the body section. A transverse bar 60 is fixed on the wall 59 and a transverse bar 61 is fixed on the wall of the body section. A cover 62 extends the full length of and completely across the body section and has on its under side rubber gaskets 63 which engage on the upper surface of the wall 59 and on the upper surface of the bars 61. Hinges 64 connect the cover 62 with the bar 60. A latch 65 attached to the cover 62 engages in the wall of the body section to hold the gaskets on the under side of the cover 62 in close contact with the bars 60 and 61 to form water tight connection of the cover with the walls of the compartment.

The means forming water tight juncture of the body sections 20 and 21 comprise a relatively wide flanged plate 66 attached to one body section and extending across the space between the ends of the body sections and preventing the gasket from being forced inwardly by water pressure; and a narrower flanged plate 67 parallel to the flanged plate 66. The plates 66 and 67 extend practically the full heighth and the full width of the inner side walls and the bottom of the body section. A rubber gasket 68 fills the space between the adjacent ends of the body sections. Bolts 69 extend through the flanges of the plates 66 and 67 and when the nuts on the bolts are tightened, the plates 66 and 67 will be drawn together to clamp the gasket 68 between the adjacent ends of the body section and form water tight connection of the body sections. Plates 70 secured on the sections 20 and 21 support the seat. The seat is transverse to the body and comprises two sections 71 and 72 connected by hinges 73. Section 72 is stationary in the body section 21 and the section 71 folds downward against the section 72, when the boat section 20 is folded on the boat section 21. To protect the contents of the trailer-body from dust and rain, I provide an end curtain 68 buttoned on a detachable strap, (not shown), extending around the sections 20 and 21 and a longitudinal curtain 69 secured on the inside of and extending along both sides and across one end of the body-section 20 and buttoning on stationary carriage knobs 77 or similar connecting devices on the body-section 21.

In practice it is desirable to raise the upper section 20 and swing it outwardly and downwardly so that one end of the section 20 may rest on the ground while the section 21 is still on the yoke-member 27; in order that when the forward end of the body section 21 is raised, the running gear may be pulled from under the section and it may be placed on the ground in position for complete water tight connection of the sections by means already described. To facilitate the handling of the uppermost body-section, I provide an eye 74 stationary on the outer wall of the body-section 20; I also provide an oar 76 having in its handle a stout hook 75 adapted to engage in the eye 74 so that the oar may be used as shown in Fig. 5 to raise and steady the body-section 20 while the body is being detached from the yoke as already described.

In use the axle clips 57 will be secured on the axle of the towing vehicle; the braces 55 having been previously attached to the base plate 49 will be connected with the axle clips by the bolts 56; the sleeve 50 will be connected with the plate 49 so that the sleeve will swivel on the plate; the draw-bar 39 will be inserted in the sleeve; a cotter pin 39ª will be inserted through a hole in the draw-bar to prevent it from pulling out of the sleeve; the body 21 will be placed on the rollers 29 and pushed forwardly until it occupies the position shown in Fig. 1 and the forward end of the body-section will rest on the spring 45 and the springs 36 and 45 will absorb shocks so that the trailer will run smoothly and the articles in the folded body-sections will not be displaced. If it be desired to detach the draft-gear from the fifth wheel it will only be necessary to tie the cord 54 on some convenient part of the towing vehicle to support the sleeve 50 in a horizontal position so that upon withdrawing the cotter pin 39ª the draw-bar may be pulled out of the sleeve and may be manipulated to facilitate demounting of the trailer-body.

I do not restrict my claims to the precise construction shown and described, since it is obvious that minor modifications may be made within the scope of the claims.

Having fully described my invention what I claim as new and desire to secure by Letters Patent is:

1. In a trailer, the combination of running gear; a centrally depressed yoke carried by the running gear; rollers in the depressed part of the yoke; a lower boat section adapted to travel on the rollers in the depressed yoke; an upper boat section inverted on the lower boat section; means connecting both boat sections with the yoke; and a yielding support on the running gear supporting one end of the united boat sections.

2. In a trailer, the combination of a trailer body comprising associated boat sections each open at one end; running gear comprising an axle, a single straight reach rigidly connected with the axle; leaf springs secured on the axle, a yoke attached to said leaf springs and supporting the rear part of the trailer body, a fifth wheel having a swivel connection with the reach, a standard fixed on the reach between the fifth wheel and the axle and a spring on the standard supporting the forward end of the associated boat sections and acting to prevent rattling of the parts.

3. A trailer comprising an axle, supporting wheels, leaf-springs on the axle, a draw-bar attached to the axle; a fifth wheel connected with the draw bar; a standard fixed on the draw bar between the fifth wheel and the axle; hinged body-sections supported on said leaf-springs and extending forwardly and yieldingly supported on said standard; and a strap surrounding both body-sections and preventing accidental displacement thereof.

4. In a trailer, the combination of a body consisting of two open end boat sections hinged together at the gunwales; a removable curtain attached to and closing the adjacent ends of both boat sections; and a longitudinal curtain extending around both sides and across the front ends of the boat sections; fasteners on the inside of the upper boat section and supporting the curtain; and fasteners on the outside of the lower boat section and engaged by the curtain in position to shed water outwardly.

5. A trailer-body comprising two open-end boat sections having hinged connection with each other, in combination with draft-gear comprising leaf-springs supporting one end of the united sections and a standard and a coiled spring surrounding said standard and yieldingly supporting the other end of the united sections.

6. A trailer body comprising two boat sections, complemental to each other and each open at one end from the keel to the gunwales; adjustable hinges uniting said sections at the gunwales thereof; angle plates inside the respective sections adjacent to the ends thereof; a gasket between the adjacent ends of said boat sections; and bolts connecting said angle plates and effective to draw them together to compress said gasket between the ends of the boat sections, to form water-tight juncture of the boat sections.

7. In a trailer, the combination of running gear, a yoke on the running gear, a lower boat section carried in the yoke and open at one end from the gunwales to the keel; an upper boat section, open at one end from the gunwales to the keel and inverted on said lower boat section to form a covered apartment accessible through the open ends of the boat sections; and hinges on the gunwales at the open ends of the boat sections and connecting the sections to permit the upper boat section to be extended right-side-up in line with the lower boat section.

8. In a trailer, a foldable and extensible trailer body comprising associated boat sections each open at one end, to admit articles into the folded body; in combination with draft gear comprising an axle, supporting wheels, one reach connected with the axle, one fifth wheel detachably connected with the reach, leaf springs attached to the axle, a standard on the reach between the fifth wheel and the axle, a yoke supported on the leaf springs and supporting the rearward parts of the associated boat sections, and a coiled spring surrounding said standard and yieldingly supporting the forward parts of the associated boat sections.

9. A fifth wheel and connections comprising a bottom plate, a top plate swiveled on the bottom plate and having an integral sleeve, a reach extending through the sleeve of the top plate and a pin transverse to the reach and detachably connecting it with the top plate.

In witness whereof I have hereunto signed my name at Springfield, Sangamon County, Illinois, this 23rd day of November, 1921.

HENRY WENNEBORG.

Witnesses:
GEO. W. KENNEY,
E. S. SPINCHE.